April 14, 1953 H. O. ANGER 2,635,231

INTERFERENCE REDUCING PULSE ECHO SIGNALING SYSTEM

Filed Dec. 10, 1945

INVENTOR.
HAL O. ANGER
BY
William D. Hall.
ATTORNEY

Patented Apr. 14, 1953

2,635,231

UNITED STATES PATENT OFFICE 2,635,231

INTERFERENCE REDUCING PULSE ECHO SIGNALING SYSTEM

Hal O. Anger, Long Beach, Calif., assignor to the United States of America as represented by the Secretary of War Application December 10, 1945, Serial No. 634,093

1 Claim. (Cl. 343—5)

This invention relates to interference eliminators and more particularly to a method of eliminating interference between a pulse operated radio set and interfering signals operating at or near the carrier frequency of the radio system.

Considerable difficulty is encountered in receiving and interpreting signals in a pulse operated radio system if a continuous wave signal either modulated or unmodulated is present in the frequency spectrum close to the carrier frequency of the pulse operated radio system. This type of interference occurs most frequently in the operation of radio object-locating systems close to unfriendly territory. It is possible for a single station to transmit a signal on or near the carrier frequency of a radio object-locating system and in so doing cause such interference on the indicator of the radio object-locating system that target echo signals are undistinguishable. This type of interference may also occur accidentally if communication equipment is operating on a frequency band close to the frequency assigned to the radio object-locating system.

It is an object of the present invention, therefore, to provide a method for eliminating or minimizing interference between a pulse operated radio system and interfering signals operating in the frequency band occupied by the radio system.

Figure 1:
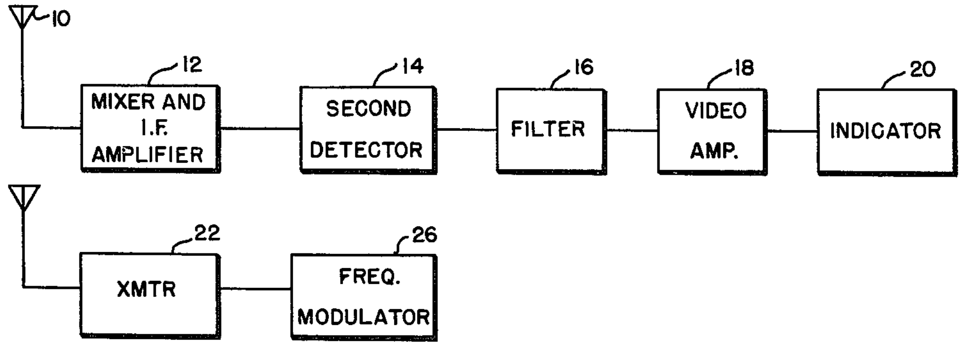
Figure 2:
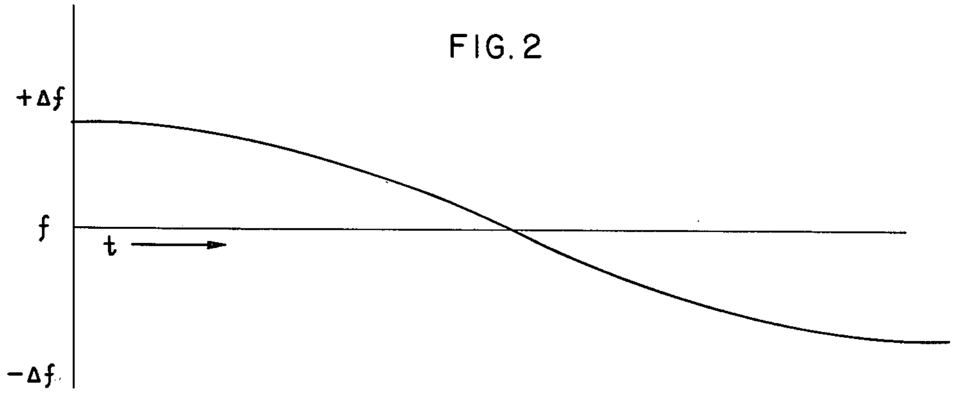

For a better understanding of the invention, together with other and further objects thereof, reference is had to the following description taken in connection with the accompanying drawing in which:

Fig. 1 is a block diagram of a radio system employing this method of interference elimination; and Fig. 2 is a plot of the carrier frequency of the system transmitter as a function of time.

Referring now more particularly to Fig. 1 wherein there are shown a receiving antenna 10 electrically connected to a mixer and intermediate frequency amplifier unit 12. Antenna 10 and amplifier unit 12 form a part of a receiver system which also includes a second detector 14, a high-pass video filter 16, a video amplifier 18, and a cathode ray indicator 20. The operation of a receiver system employing a video high-pass filter connected between the second detector and the video amplifier is fully described in the copending application of Hal O. Anger, Serial No. 634,092, filed December 10, 1945. An additional description of the operation of such a receiver system will be given in connection with the operation of this invention. Also shown in Fig. 1 is a pulse transmitter 22 electrically connected to a transmitting antenna 24. A frequency modulator 26, electrically connected to transmitter 22, provides means for systematicaly sweeping the carrier frequency of transmitter 22 over a predetermined range. Modulator 26 may accomplish the frequency modulation of transmitter 22 in any one of several ways including rotating a paddle or similar device located in the transmitter tuning circuit. Such modulating methods are not new and, therefore, require no further description.

It should be kept in mind as the description of this invention proceeds that the system shown in Fig. 1 serves only to illustrate the operation of this invention and that modifications and changes may be made in the system shown without in any way changing the operation of this invention. Let it be assumed that transmitter 22 normally operates on some carrier frequency $f$ and that frequency modulator 26 causes the carrier frequency of transmitter 22 to shift by an amount equal to $\Delta f$ on each side of the frequency $f$. Fig. 2 illustrates the frequency of transmitter 22 as a function of time. The range of frequencies through which carrier the frequency of transmitter 22 is swept, which in this case is equal to $2\Delta f$, is normally made equal to the band width of the receiver system associated with transmitter 22 and the frequency with which transmitter 22 is caused to sweep through this range of frequencies is kept at some low value, for example, 200 cycles per second. Assume further that a "jamming" or interfering station is operating on a carrier frequency equal to frequency $f$ and that this carrier frequency is modulated at some moderately high frequency, for example, 200 kilocycles per second. Signals in the output of detector 14, Fig. 1, will include in addition to the signals that will be received if the interfering signals had not been present signals that are the result of the combination of the interfering signal and the signal from transmitter 22. These combination or "beat" signals will vary in frequency as transmitter 22 varies in frequency. At the extreme limits of the frequency excursion of transmitter 22 these signals will have a frequency at least equal to the frequency difference $\Delta f$. Filter 16, Fig. 1, is designed to have high attenuation to signals having a frequency equal to or less than the modulation signal of the jamming station. Since the modulation frequency of the jamming station is usually not under the control of the operator of the radio system and is usually not known in advance, it is advisable to design filter 16 to have a cutoff frequency as high as the highest frequency likely to be encountered. In this case filter 16 might have a cutoff frequency of 500 kilocycles. The signals applied to video amplifier 18 will not contain the modulation frequency of the interfering signal since these signals are attenuated in filter 16. Some of the frequencies making up the video echo signals will be attenuated, however, the input will contain "beat" frequencies between the interfering signal and the received echo signal, and these "beat" frequency signals will provide an indication on cathode ray indicator 20 that is substantially similar to the indication that would have been caused by the normal video signals. Since the interfering signal does not reach indicator 20, the screen of this indicator will be entirely free at interference from said signal.

To illustrate the operation of this system assume the receiver bandwidth to be 4 megacycles and the interference frequency to be at the center frequency $f$ and modulated by a 200 kilocycle note. In order to eliminate the effects of this jamming signal, the transmitter frequency is swept through a range of 4 megacycles (2 megacycles on either side of the receiver center frequency $f$) at the rate of 200 cycles per second and high pass filter 16 is tuned to pass frequencies above 500 kilocycles. The 200 kilocycle note is eliminated by the filter, but during the periods of pulse reception when the beat frequency of the interference signal and the pulse modulated signal is greater than 500 kilocycles, a video output pulse will appear on the screen of the indicator.

The advantages of this invention are thought to be obvious from the foregoing discussion. Interference between a pulse operated radio system and an interfering signal having a frequency equal to normal carrier frequency of the radio system has been eliminated by the addition of a simple frequency modulation unit to the transmitter of the radio system. It is obvious that this system will also operate if the interfering signal lies within a range $\Delta f$ on either side of the normal carrier frequency of the radio system. If the interfering signal differs from the normal carrier frequency of the radio system by an amount greater than $\Delta f$, the interfering signal will not be passed by the normal radio receiver so no steps are necessary to prevent interference.

While there has been described what is at present considered the preferred embodiment of this invention, it will be obvious to those skilled in the art that various changes and modifications may be made therein without departing from the invention.

What is claimed is:

A radio pulse-echo system for avoiding jamming by modulated continuous wave jamming signals having a highest modulation frequency not exceeding a predetermined supersonic frequency, said system comprising a receiver, having a reception bandwidth greater than twice said predetermined frequency, for receiving pulse echo and jamming signals; a pulse transmitter; means for periodically sweeping the carrier frequency of said transmitter between the frequency limits of said reception bandwidth; said receiver including a modulation envelope detector, a high pass filter coupled to said detector, said high pass filter having its low cut-off frequency equal to said predetermined frequency, and means connected to said filter for using the output thereof.

HAL O. ANGER.

References Cited in the file of this patent

UNITED STATES PATENTS

| Number | Name | Date |
|---|---|---|
| 2,236,893 | Chaffee | Apr. 1, 1941 |
| 2,294,129 | Purington | Aug. 25, 1942 |
| 2,361,437 | Trevor | Oct. 31, 1944 |
| 2,401,619 | Trevor | June 4, 1946 |
| 2,407,644 | Benioff | Sept. 17, 1946 |
| 2,416,351 | Schelleng | Feb. 25, 1947 |
| 2,448,055 | Silver | Aug. 31, 1948 |
| 2,490,808 | Hoffman | Dec. 13, 1949 |
| 2,525,328 | Wolff | Oct. 10, 1950 |

FOREIGN PATENTS

| Number | Country | Date |
|---|---|---|
| 811,767 | France | Jan. 23, 1937 |